Aug. 16, 1966  M. C. VOISSEM  3,266,346
HOLE CUTTER
Filed March 2, 1964

INVENTOR.
MARVIN C. VOISSEM
BY
Wheeler, Wheeler + Wheeler
ATTORNEYS 3,266,346
HOLE CUTTER
Marvin C. Voissem, Appleton, Wis., assignor to Badger Plug Company, Appleton, Wis., a corporation of Wisconsin
Filed Mar. 2, 1964, Ser. No. 348,454
10 Claims. (Cl. 77—79)

This invention relates to a hole cutter.

Most hole cutters of this type require connection with the electric drill housing or other device which powers the cutter. The present hole cutter is carried entirely on and manipulated with the chuck at the end of the driving shaft with which the spindle of the hole cutter is connected. The hole cutter comprises a tool having a spindle with a work-engaging point and a transverse bridge member upon which one or more knives may be mounted at controlled radial distances from the spindle axis.

The knife or knives are encircled and partially enclosed by a casing member which comprises a tubular handle encircling the shank of the spindle. The casing has a flange which has teeth such as sharpened pins for engaging the work to hold the casing from rotation during operation of the cutter tool. The spindle and the knife support and the knives are normally retracted within the casing subject to the bias of a spring which is compressed when the operator exerts pressure on the spindle (as by manipulating an electric drill to which the spindle is chucked) to force the cutting knives out of the open end of the casing into engagement with the work.

Surrounding the locating point at the forward end of the spindle is a stripper plate supported by pins which float in holes in the tool support or bridge member and are connected at their upper ends by a tie bar which floats around the spindle. The arrangement is such that the compression spring retracting the tool normally holds the tie bar in engagement with a stop, which may be a boss in the interior of the casing, but as soon as the tool is advanced by pressure of the electric drill on the shaft of which the tool is mounted, the tie bar is relieved of thrust. Hence, it can float between the casing and the work and the stripper plate will rotate with no pressure and little friction on the surface of the work.

The locating point at the end of the tool has an elongated tip that projects through an opening in the stripper plate. The arrangement is such that a disk severed from the work by the rotating knife or knives will never reach the base of the tapered portion of the tip. Thus the severed disk will never be held frictionally on the tip but will readily be ejected therefrom when the tie bar strikes the boss during the spring-actuated retractive movement of the spindle-knife assembly when the actuating electric drill is lifted following a cutting operation.

In the drawings:

FIG. 2 is an enlarged detail view in vertical section, the spindle shank being mounted in a chuck which may be assumed to be on the output shaft of an electric drill or the like.

Figure 1:
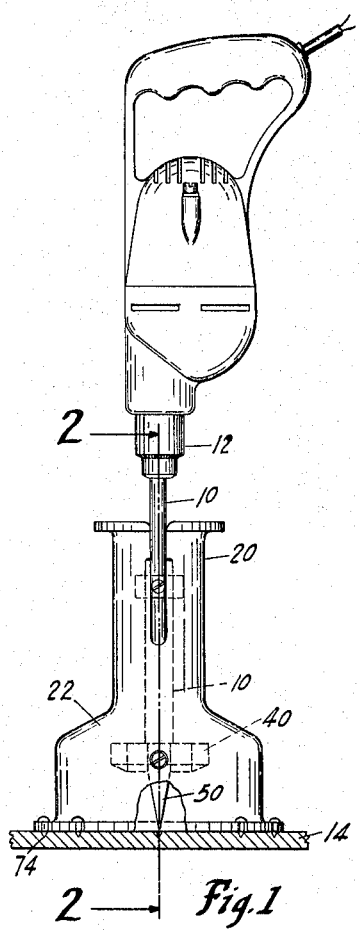
FIG. 1 is a view in side elevation of a hole cutter embodying the invention, the spindle being fragmentarily illustrated.
Figure 3:
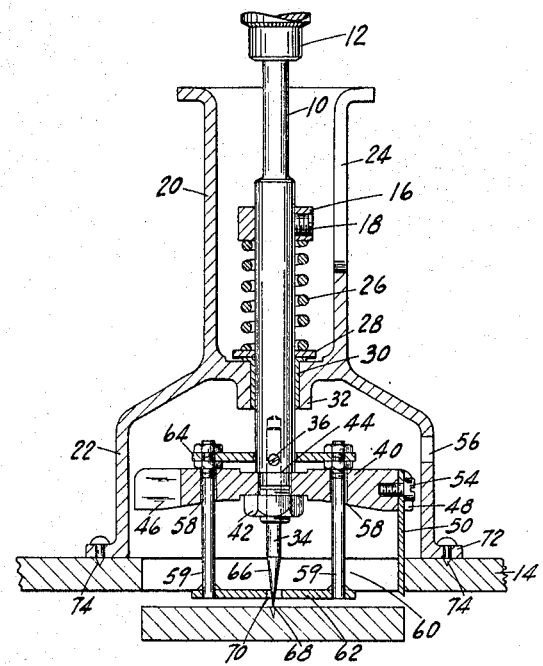
FIG. 3 is a fragmentary view similar to FIG. 2 showing the hole cutter engaged with a piece of work from which the knife blade has severed a disk.

The hole cutter comprises a spindle 10 having its shank mounted in the chuck 12 of a power shaft such as that of an electric drill, the chuck being bodily movable (as by manipulation of the drill) and to from a workpiece such as the board 14 shown in FIG. 3. The entire tool is dependent for its position on the chuck 12, having no connection with electric drill casing or other bearing support for the driving shaft of which chuck 12 is a part.

Mounted on the spindle 10 is a collar 16 anchored by a set screw 18. This part of the spindle is housed within the tubular handle 20 of a housing 22, the set screw being accessible through a slot 24 in the handle portion 20 of the housing. A compression spring 26 encircles the spindle and is seated against the collar 16. The other end of the spring seats on a thrust washer 28 engaged with a bearing bushing 30 in which the spindle 10 is rotatable and reciprocable. The bushing 30 lies within a boss 32 of housing 22. This boss plays an important part in the ejection of waste from the centering point 34 adjustably mounted in the end of spindle 10 and fixed therein by set screw 36.

Mounted on spindle 10 is a bridge member or cutter blade holder 40 clamped by nuts 42 against the spindle shoulder 44. Blade holder 40 has radial notches, 46, 48 which are desirably of differing depth to receive and position respective knives 50 and/or 52 at differing radii from the spindle axis. Either or both knives may be used. If it is desired merely to sever a disk from the workpiece 14, a single knife will suffice, such single knife being located in the notch 46 of the notch 48 according to the radius at which it is desired to cut the disk. By using both knives at differing radii, it is possible to cut an annulus and a disk in one operation. The cap screws 54 which hold the knives are accessible through openings 56 in the side wall of the casing 22.

The cutter blade holder 40 has openings 58 parallel to the spindle axis for the respective rods 59 which are part of a floating stripper assembly 60. The stripper 60 includes a stripper disk 62 and a stripper tie bar 64, the disk and bar being unitarily connected by the rods 59. The tie bar is located beneath the boss 32 on the tool shank 10.

The extremity 66 of the centering point 34 has an elongated taper to an apex 68. In the retracted position of the parts shown in FIG. 2, apex 68 projects through an opening 70 in the stripper plate 62. The arrangement is such that a severed disk engaged on the tapered extremity 66 of the centering point 34 is never permitted by the stripper plate 62 to go beyond the taper onto the cylindrical portion of the centering point 34. The purpose of this arrangement is to preclude the waste from adhering frictionally to the centering point. The fact that it is always on the tapered extremity facilitates the stripping operation.

The casing 22 has an outwardly extending peripheral flange 72 equipped with teeth which here take the form of sharp pins 74 engageable with the workpiece. When the chuck is advanced toward the work, the teeth 74 slightly penetrate the work to position the casing in centered relation with the apex 68 of the locating point 34 on the axis of rotation of shank 10 and at the center of the disk to be cut from the work.

Figure 2:
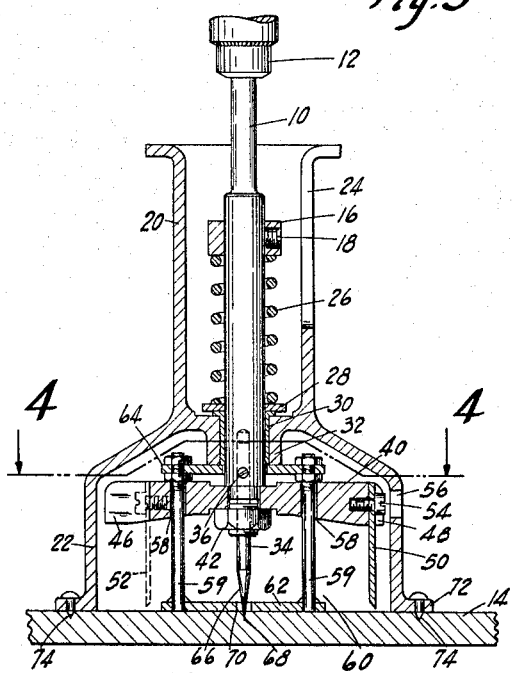
Figure 4:
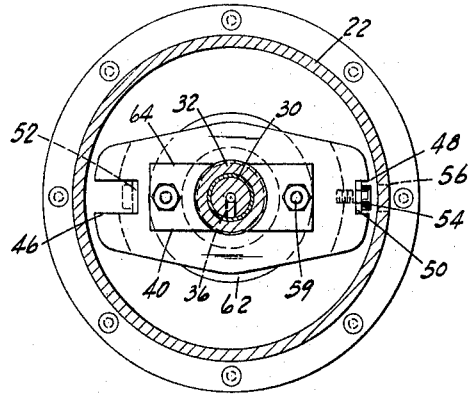
FIG. 4 is a detail view on an enlarged scale taken on line 4—4 of FIG. 2.

The bias of spring 26 exerted between the housing 22 and the spindle 10 maintains the knife or knives normally retracted within the housing as in the position of the parts shown in FIG. 2. However, when additional downward thrust is exerted on the spindle 10, as by advancing chuck 12 with its drill or other support toward the work, the casing stops upon engaging the work and the spindle assembly continues in axial motion, thereby compressing the spring 26. Centering point 34 then enters the work and the knife or knives finally engage the work and cut it upon one or more annular paths concentric with the point 34.

The stripper assembly 60 is constrained by the bolts 59 to rotate with the spindle and cutter blades but, due to the compression of spring 26 and the resulting increase in clearance between the tool carrier 40 and the boss 32, the tie bar 64 is wholly relieved of thrust and the entire stripper floats within the casing, having no pressure engagement with the work or with the casing and consequently little or no friction on the work. Consequently, even though plate 62 may rest on the surface of the work, there is little or no resistance offered to the rotation of the cutting blade.

When the work has been penetrated by the knife or knives and a disk has been severed from the work, the downward thrust of the chuck is relaxed and the compression spring 26 thereupon expands to act through spindle 10 to withdraw the knife or knives and their holder 40 into the casing 22. This causes the tie bar 64 of the stripper 60 to engage the boss 32 thereby holding the stripper plate 62 and the waste or disk cut from the work against retraction during the withdrawal of the tapered portion 66 of point 34 from the severed disk. The disk thereupon falls freely from the tapered extremity 66 and the operation of cutting a hole in the work has been completed.

The spindle 10 and all parts assembled thereon can readily be withdrawn from the casing 22 when the set screw 18 is unscrewed by means of a tool inserted through the slot 24 in the handle portion 20 of the casing.

I claim:

1. A hole cutting tool comprising a spindle, a cutter blade holder mounted on the spindle, a cutter blade on the holder in a position radially offset from the axis of the spindle, a casing enclosing the blade and having a bearing in which the spindle is rotatable and axially movable between advanced and retracted positions, stop means on the casing for limiting the retractive movement of the spindle and holder, and a floating ejector having a rear portion interposed between the stop means and the cutter blade holder and engageable with the stop means upon retraction of the spindle, said ejector including support elements for which the cutter blade holder provides bearings in which the support elements are freely movable, and a stripper plate carried by the support elements and adapted to strip severed workpieces from the forward end of the spindle.

2. A hole cutting tool according to claim 1 in which the stop means comprises a boss disposed in the interior of the casing and in which said bearing is disposed.

3. A hole cutting tool according to claim 1 in which the casing includes a tubular portion of reduced diameter through which the spindle extends, the spindle having a spring seat housed within said casing portion, and a spring confined between said seat and said bearing and adapted to oppose axial movement of the spindle toward its advanced position.

4. A hole cutting tool according to claim 1 in which the casing has an open end beyond said bearing and through which the cutter blade on the holder is projected in the movement of the spindle toward its advanced position, the spindle having a locating point projecting farther than the blade toward the advanced position of the spindle, said stripper plate having an aperture through which the locating point extends, said point having an elongated taper of such length that it never passes completely through the opening in the stripper plate even in the advanced position of the spindle.

5. A hole cutting tool according to claim 1 in which the cutter blade holder has seats at different radial positions and on which said blade is selectively mounted according to the desired radius of the blade from the spindle axis.

6. A hole cutting tool according to claim 5 in further combination with a second tool cutting blade mounted on the holder seat other than that on which the blade first mentioned is mounted, the two blades severing an annular workpiece from the work.

7. A hole cutter comprising in combination a spindle having a shank adapted to be mounted in and manipulated by a driving chuck and provided with a spring seat, said spindle having a locating point at its end remote from the spring seat, a cutter blade holder fixedly mounted on the spindle for rotation therewith, a cutter blade mounted on the holder in a position to rotate about the axis of said point, a casing enclosing the cutter blade holder, said casing being provided with bearings axially reciprocable on the spindle and in which the spindle is rotatable, the casing having an open end through which the cutter blade may be projected by the axial movement of the spindle with respect to the casing, spring means engaged with the spindle spring seat and for which the casing provides a second seat, said spring means biasing the spindle in a direction to retract the blade within the casing, and a stripper having a portion encircling said point and another portion interposed between the cutter blade holder and said casing bearing and adapted to absorb thrust of said spring as transmitted through the spindle and the cutter blade holder, said stripper portions having connecting means mounted on and freely reciprocable with respect to the cutter blade holder, said stripper rotating with the spindle when the spindle is in rotation and being floated for independent movement axially of the spindle whereby to be relieved of thrust as the spindle is advanced through the casing bearing, the spring biased retraction of the spindle causing the seating of said ejecting device against the casing whereby to force from said point a workpiece portion severed by the cutter blade and tending to adhere to said point.

8. A hole cutting tool comprising the combination with a tubular handle on an enlarged bell-shaped housing with an open end opposite the handle and a bearing on the housing adjacent the handle, the housing having work-engaging teeth projecting from its open end, a spindle rotatably mounted in said bearing and axially movable therein between advanced and retracted positions, a hole cutting blade having a mounting member for supporting it from said spindle, said blade being positioned for advance from the open end of said casing in the movement of the spindle toward its advanced position, a centering point mounted on the spindle in a position to engage the work with which the teeth of said casing are engaged, the said blade being movable about said point, and a stripper for ejecting from said point a workpiece severed by said blade, the said stripper comprising an ejector plate directly engageable with said workpiece and means floating with respect to the spindle and the blade for positioning said plate, said casing having stop means with which said ejector is engageable in the movement of the spindle to its retracted position and constituting means for causing said plate to detain the workpiece engaged thereby as the spindle moves to the retracted position, whereby said point is retracted from the workpiece.

9. A hole cutting tool according to claim 8 in which the spindle has a socket in which said point is detachably mounted.

10. A hole cutting tool according to claim 8 in which the cutter blade holder comprises a bridge member having a centrally apertured portion mounted on the spindle and having a seat radially remote from the spindle to which the blade is attached, said ejector including rods extending through holes with which the bridge member is provided, said rods being connected with the ejector plate and having a tie bar connecting the rods at the other side of said bridge member from said plate, the said bearing being disposed in a boss with which the interior of the casing is provided and against which said tie bar engages under thrust of the spindle-mounted bridge member in the course of the movement of the spindle to retracted position.

References Cited by the Examiner

FOREIGN PATENTS 7,086  1891  Great Britain.

WILLIAM W. DYER, Jr., *Primary Examiner.*

FRANCIS S. HUSAR, *Examiner.*